United States Patent [19]

Proud

[11] 4,029,182

[45] June 14, 1977

[54] OVERHEAD ELECTRIC TRACTION SYSTEMS

[75] Inventor: Stanley Harold Russell Proud, Marlow, England

[73] Assignee: Bicc Limited, London, England

[22] Filed: Dec. 30, 1975

[21] Appl. No.: 645,334

[30] Foreign Application Priority Data

Dec. 31, 1974 United Kingdom ............ 56249/74

[52] U.S. Cl. .................................................. 191/39
[51] Int. Cl.² .......................................... B60M 1/18
[58] Field of Search ............... 104/124; 191/39–41, 191/23 A; 238/152

[56] References Cited

UNITED STATES PATENTS

| 1,357,215 | 11/1920 | Boggs | 191/39 |
|---|---|---|---|
| 1,705,689 | 3/1929 | Swars | 191/39 |
| 1,886,463 | 11/1932 | Birch | 191/41 |
| 3,829,630 | 8/1974 | Belyaev | 191/41 |

FOREIGN PATENTS OR APPLICATIONS

| 1,235,725 | 4/1963 | France | 191/40 |
|---|---|---|---|
| 1,912,909 | 9/1970 | Germany | 191/39 |
| 1,935,365 | 1/1971 | Germany | 191/39 |

*Primary Examiner*—Stephen G. Kunin
*Attorney, Agent, or Firm*—Buell, Blenko & Ziesenheim

[57] ABSTRACT

In a neutral section of an overhead electric traction system the contact wire and at least one catenary wire of one of two adjacent sections of the overhead electric traction system are secured to one end of an elongate insulated runner and the contact wire and at least one catenary wire of the other sections are secured to the other end of said elongate insulated runner or to one end of a second elongate insulated runner. At least one metallic member is positioned between and is spaced from the ends of said insulated runner, or separates and is connected to the other ends of said insulated runners, the undersurfaces of the contact wires, said insulated runner or runners and the elongate metallic member lying in a substantially common plane. At each of a plurality of spaced positions along the length of the neutral section, apparatus is provided for suspending the neutral section form a supporting structure, each of at least some of said suspension apparatus being of such a form as to resist any torsional load to which the insulated runner or runners may be subjected and at least said suspension apparatus at each end of the neutral section being so resiliently loaded as to assist in lifting of the neutral section to a height similar to that of the adjacent contact wires as a current collector runs through. the neutral section is especially suitable for installation under a bridge or in a tunnel.

19 Claims, 3 Drawing Figures

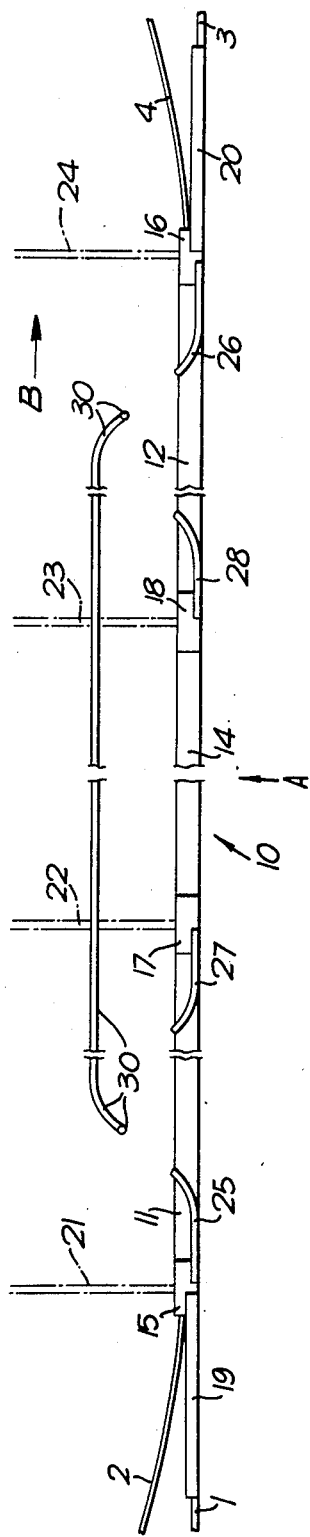
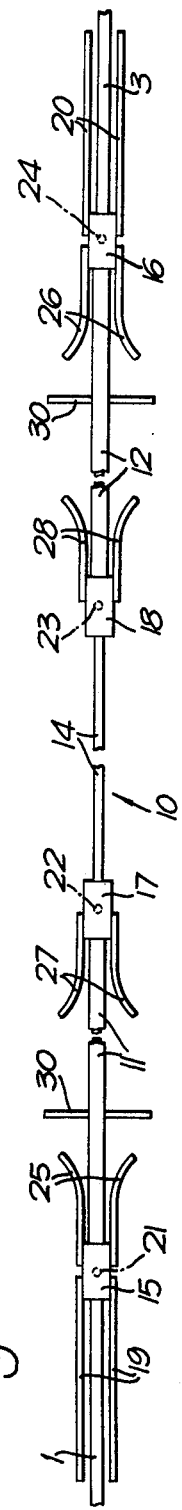
Fig. 1.
Fig. 2.

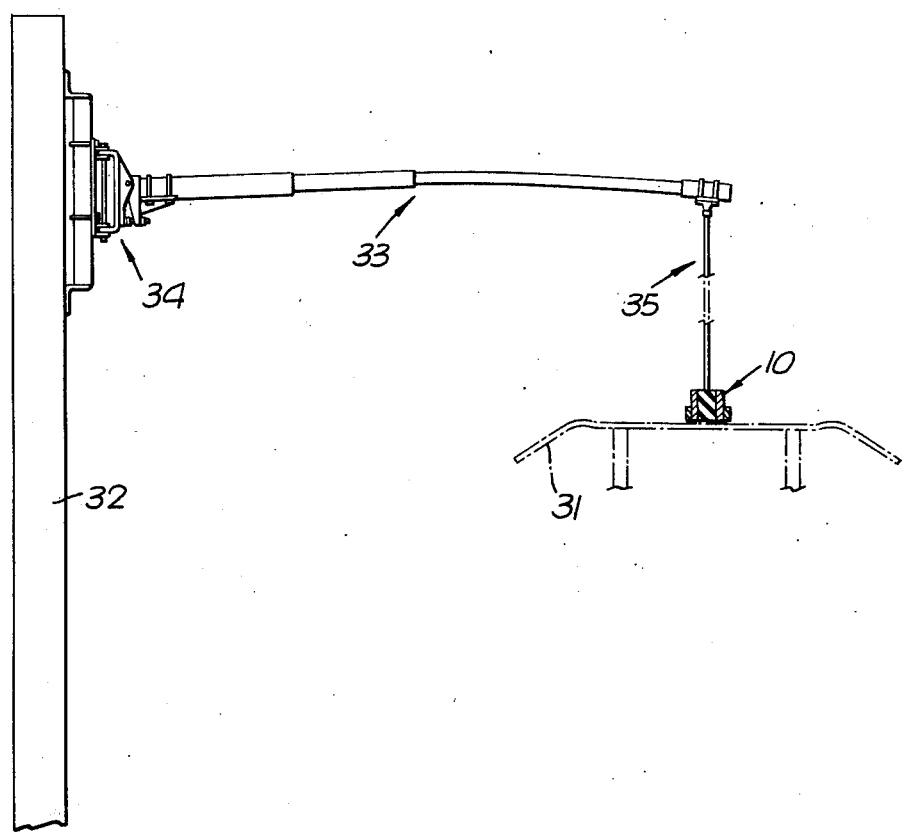

OVERHEAD ELECTRIC TRACTION SYSTEMS

This invention relates to overhead electric traction systems of the kind in which an overhead contact wire is suspended at spaced intervals along its length from one or more than one catenary or auxiliary wire (hereinafter referred to as catenary wires) and in which current is collected from the overhead contact wire by means of a current collector of the kind comprising a shoe or bar which extends transversely of the contact wire and is, in its operative position, pressed upwards into contact with the undersurface of the contact wire, usually, but not in all cases, by mounting it on a spring-loaded pantograph mechanism mounted on the roof of a vehicle.

For the purpose of electrically separating two adjacent sections of an overhead electric traction system of the aforesaid kind which are to be supplied with alternating or direct current from different sub-stations, usually from different phases of the main supply system, it is the practice to insert between these sections an item of equipment generally referred to as a neutral section. In addition to electrically isolating from one another the sections between which it is inserted, a neutral section must also transmit the tension in the contact and catenary wires of one of the sections to those of the other section and serve to transfer a current collector smoothly from the contact wire in one section across the neutral section to the contact wire of the other section. Neutral sections of the type described and claimed in the Complete Specification of our British Patent No. 983526 currently employed in overhead electric traction systems operating at 25 kV are perfectly satisfactory when a train or other vehicle is travelling at any speed up to about 180 km/hr but, in some circumstances, in overhead electric traction systems operating at a voltage substantially above 25 kV and/or at speeds substantially above 180 km/hr severe mechanical forces on the neutral section can occur as the current collector runs through, with the consequential risk of mechanical damage to or failure of the components of the neutral section.

It is an object of the present invention to provide for an overhead electric traction system an improved neutral section through which a current collector can run at any speed up to about 300 km/hr in overhead electric traction systems operating at any voltage up to about 50 kV, with negligible risk of mechanical failure of the neutral section.

In the neutral section in accordance with the invention, the contact wire and at least one catenary wire of one of two adjacent sections of the overhead electric traction system which are to be electrically separated by the neutral section are secured to one end of an elongate insulated runner; the contact wire and at least one catenary wire of the other of said two sections of the system are secured to the other end of said elongate insulated runner or to one end of a second elongate insulated runner; at least one metallic member which may be electrically connected to earth is positioned between and is spaced from the ends of said insulated runner, or separates and is connected to the other ends of said insulated runners, the under surfaces of the contact wires, said insulated runner or runners and the elongate metallic member, or at least one of the elongate metallic members, lying in a substantially common plane; and, at each of a plurality of spaced positions along the length of the neutral section, means is provided for suspending the neutral section from a supporting structure, each of at least some of said suspension means being of such a form as to resist any torsional load to which the insulated runner or runners may be subjected and at least said suspension means at each end of the neutral section being so resiliently loaded as to assist in lifting of the neutral section to a height similar to that of the adjacent contact wires as a current collector runs through.

The two insulated runners may be elongate end parts of a single elongate body of insulating material extending between the contact and catenary wires of the two adjacent sections and the metal member comprises, a single elongate metallic sleeve which extends over an intermediate part of the length of the elongate body of insulating material, but for ease of manufacture it is preferred for the neutral section to include two separate elongate insulated runners separated by, and in alignment with and connected to opposite ends of, a single elongate metallic member.

With a view to resisting any twisting of the contact wires, preferably the contact and catenary wires of each of the two sections are so connected to the adjacent insulated runner that their axes lie in a common substantially vertical plane. Preferably, also, each insulated runner is of substantially flattened cross-section, for instance of oval or approximately rectangular cross-section, and is arranged with its major transverse axis substantially vertical.

Each insulated runner may be of composite form and, in this case, preferably it comprises at least one elongate body of high tensile modulus and high tensile strength, made at least substantially of insulating material, for instance a rod of resin-bonded glass fibre, and provided with metal terminal fittings, and at least one elongate body of abrasion-resistant ceramic or vitreous insulating material which is associated with, and extends lengthwise between the terminal fittings of, the elongate body or bodies of high tensile modulus and strength and which provides an effective running surface, the outermost surface of the insulated runner between its terminal fittings being of an insulating material that is resistant to tracking.

The neighbouring ends of the two insulated runners may be separated by, and connected to the opposite ends of, elongate metallic members corresponding in number and position to the contact and catenary wires of each of the two sections but, with a view to providing resistance to bending in a substantially vertical plane that is similar to that of the insulated runners, preferably the neighbouring ends of the two insulated runners are separated by, and connected to the opposite ends of, a single elongate metallic member of substantially flattened transverse cross-section, for instance approximately rectangular cross-section, arranged with its major transverse axis substantially vertical. In all cases at least that part of the elongate metallic member on which its undersurface, or running surface, is formed, is of a metallic material that is highly resistant to wear, for instance boronized stainless steel.

Preferably, in addition to the suspension means at each end of the neutral section, the suspension means at each of the other longitudinally spaced positions at which the neutral section is suspended from a support structure is so resiliently loaded as to assist further in lifting of the neutral section as a current collector runs through. Each suspension means preferably comprises a steady arm which is supported by or secured to a cantilever structure or other support structure. Resilient loading of each steady arm is preferably obtained by employing a steady arm which is of such a material that the steady arm itself has the required degree of inherent resilience, for instance a steady arm comprising a rod of resin-bonded glass fibre or of metal or metal alloy and/or by resiliently mounting a steady arm on a support structure by means of at least one spring. Preferably the neutral section is suspended by four steady arms, one secured to the neutral section at or near each of the terminal fittings of the insulated runners.

To reduce the risk that wear of the undersurface of that part of the contact wire adjacent an insulated runner may in time result in the formation of a sharp corner at the terminal fitting against which a current collector might strike, there may be provided on opposite sides of said part of the contact wire a pair of supplementary elongate metallic runners which are electrically connected to the contact wire and whose undersurfaces lie in substantially the same plane as the undersurface of the adjacent insulated runner and are of a metallic material that is highly resistant to wear. The supplementary elongate metallic runners may be separately formed but mechanically secured together above the contact wire with which they are associated or they may be the limbs of a single elongate metallic member having a transverse cross-section of substantially inverted channel-shape. Where the or each catenary wire is a stranded conductor of aluminium or aluminium-based alloy, a length of the catenary wire adjoining each of the insulated runners may be replaced by a length of contact wire.

As in neutral sections of the type described and claimed in British Patent No. 983526, preferably there is associated with each of the terminals of the insulated runners a pair of elongate arcing horns supported one on each side of the contact wire. Over a part of each elongate arcing horn its undersurface may lie in substantially the same plane as the undersurface of the insulated runner with which it is associated so that the arcing horn forms the last metallic contact for the current collector as the current collector passes over a length of contact wire on to an insulated runner and the first metallic contact for a current collector as the current collector passes from an insulated runner on to a contact wire or other elongate metallic member so as to direct any electric arc away from the vicinity of the metal terminals of the insulated runners. Preferably, also, an earthed elongate arcing horn is supported from the supporting structure of the neutral section, the ends of which are spaced at the required electrical clearance from the inner ends of the arcing horns associated with the outer terminal fittings.

It will be appreciated that, since the contact and catenary wires of each of the two sections separated by the neutral section are brought into close relationship when they are connected to one end of an insulated runner, the vertical height occupied by the or each support structure from which the neutral section is suspended and the insulated runners and intervening elongate metallic member or members of the neutral section is substantially less than in a normal section of the overhead electric traction system with the result that the neutral section of the present invention has the important advantage that, if desired, it can be positioned under a bridge or in a tunnel.

The invention is further illustrated by a description, by way of example, or a preferred neutral section of an overhead electric traction system, with reference to the accompanying diagrammatic drawings, in which:

FIG. 1 is a side elevation of the neutral section,

FIG. 2 is a view looking in the direction of arrow A in FIG. 1 and,

FIG. 3 is a view looking in the direction of arrow B in FIG. 1.

Referring to the drawings, the contact wire 1 and catenary wire 2 of one of two adjacent sections of the overhead electric traction system are electrically separated from but secured to the contact wire 3 and catenary wire 4 of the other of the two adjacent sections by a neutral section 10. The neutral section 10 comprises two elongate insulated runners 11, 12 — separated by and connected to opposite ends of an elongate metallic member 14 which is connected to earth. Each insulated runner 11, 12 comprises a rod of resin bonded glass fibre which, over a major intermediate part of its length, is surrounded by and bonded to a tube of vitreous material, the parts of the rod protruding from the tube each having a metal terminal fitting compression jointed to it. The contact wire 1 and catenary wire 2 are so connected to one terminal fitting 15 of the insulated runner 11, and the contact wire 3 and catenary wire 4 are so connected to one terminal fitting 16 of the insulated runner 12, that the axes of the contact and catenary wires of each section lie in a substantially vertical plane. As will be seen on referring to FIGS. 1 and 2, at each of four longitudinally spaced positions 21, 22, 23 and 24 the neutral section is suspended from a steady arm (not shown) which is supported from a mast alongside the track. The steady arms at positions 21 and 24 are of resin bonded glass fibre; the steady arms at positions 22 and 23 are of metal and are resiliently mounted on the masts by means of springs. Each steady arm both resists any torsional load to which the insulated runners 11, 12 may be subjected and assists in lifting of the neutral section to a height similar to that of the adjacent contact wires 1 and 3 as a current collector 31 (FIG. 3) runs through.

FIG. 3 shows the steady arm 33 at position 24 which is hinged to a mast 32 or other supporting structure by an end fitting 34 and from which the neutral section 10 is suspended by means of a telescopic dropper 35.

The contact wires 1, 3, respectively, each has a pair of supplementary elongate metallic runners 19, 20 provided on opposite sides of the part of the contact wire adjacent the associated insulated runner. With each of the terminal fittings 15, 16, 17 and 18 of the insulated runners 11, 12 there is associated a pair of elongate arcing horns 25, 26, 27 and 28 supported on each side of the contact wire. An earthed arcing horn 30 is supported from the masts at positions 22 and 23, the ends of which are spaced at the required electrical distance from the inner ends of the arcing horns 25 and 26 associated with the terminal fittings 15 and 16.

What I claim as my invention is:

1. A neutral section of an overhead electric traction system wherein a contact wire and at least one catenary wire of one of two adjacent sections of the overhead electric traction system which are to be electrically separated by the neutral section are secured to one end of an elongate insulated runner; the contact wire and at least one catenary wire of the other of said two sections of the system are secured to one end of a second elongate insulated runner; at least one elongate metallic member separates and is connected to other ends of said insulated runners, the undersurfaces of the contact wires, said insulated runners and said elongate metallic member lying in a substantially common plane; and, at each of a plurality of spaced positions along the length of the neutral section, means is provided for suspending the neutral section from a supporting structure, each of at least some of said suspension means being of such a form as to resist any torsional load to which the insulated runners may be subjected and at least said suspension means at each end of the neutral section being so resiliently loaded as to assist in lifting of the neutral section to a height similar to that of the adjacent contact wires as a current collector runs through.

2. A neutral section as claimed in claim 1, wherein the contact wire and at least one catenary wire of each of the two sections are so connected to the adjacent insulated runner that their axes lie in a common substantially vertical plane.

3. A neutral section as claimed in claim 1, wherein each insulted runner is of substantially flattened transverse cross-section and is arranged with its major transverse axis substantially vertical.

4. A neutral section as claimed in claim 1, wherein the metallic member is connected to earth.

5. A neutral section as claimed in claim 1, wherein, in addition to the suspension means at each end of the neutral section, the suspension means at each of the other longitudinally spaced positions at which the neutral section is suspended from a support structure is so resiliently loaded as to assist further in lifting of the neutral section as a current collector runs through.

6. A neutral section as claimed in claim 5, wherein each suspension means comprises a steady arm which is supported by a support structure.

7. A neutral section as claimed in claim 6, wherein each steady arm is of such a material that the steady arm itself has the required degree of inherent resilience.

8. A neutral section as claimed in claim 6, wherein the neutral section is suspended by four steady arms, secured to the neutral section near terminal fittings of the aligned insulated runners.

9. A neutral section as claimed in claim 1, wherein at least that part of the elongate metallic member on which its undersurface, or running surface, is formed, is of a metallic material that is highly resistant to wear.

10. A neutral section as claimed in claim 1, wherein a pair of supplementary elongate metallic runners are provided on opposite sides of that part of the contact wire adjacent an insulated runner, which supplementary runners are of a metallic material that is highly resistant to wear and are electrically connected to the contact wire and have undersurfaces that lie in substantially the same plane as the undersurface of the adjacent insulated runner.

11. A neutral section as claimed in claim 10, wherein the supplementary elongate metallic runners are the limbs of a single elongate metallic member having a transverse cross-section of substantially inverted channel-shape.

12. A neutral section as claimed in claim 1 in which each catenary wire is a stranded conductor of aluminium, wherein each of the lengths of catenary wire adjoining the insulated runners is a length of contact wire.

13. A neutral section as claimed in claim 1, wherein there is associated with each of the terminals of the insulated runners a pair of elongate arcing horns supported one on each side of the contact wire.

14. A neutral section as claimed in claim 13, wherein over a part of each elongate arcing horn its undersurface lies in substantially the same plane as the undersurface of the insulated runner with which it is associated so that the arcing horn forms a last metallic contact for a current collector as the current collector passes over a length of contact wire on to an insulated runner and the first metallic contact for a current collector as the current collector passes from an insulated runner on to a contact wire or the elongate metallic member so as to direct any electric arc away from the vicinity of the metal terminals of the insulated runners.

15. A neutral section as claimed in claim 14, wherein an earthed elongate arcing horn is supported from the supporting structure of the neutral section, the ends of which are spaced at a required electrical clearance from the inner ends of arcing horns associated with outer terminal fittings.

16. A neutral section as claimed in claim 1, wherein each insulated runner comprises at least one elongate body of high tensile modulus and high tensile strength made at least substantially of insulating material and provided with metal terminal fittings and at least one elongate body of abrasion-resistant ceramic or vitreous insulating material which is associated with, and extends lengthwise between the terminal fittings of, the elongate body of high tensile modulus and strength and which provides an effective running surface, the outermost surface of the insulated runner between its terminal fittings being of an insulating material that is resistant to tracking.

17. A neutral section in accordance with claim 1, when positioned under a bridge.

18. A neutral section in accordance with claim 1, when positioned in a tunnel.

19. A neutral section of an overhead electric traction system wherein a contact wire and at least one catenary wire of one of two adjacent sections of the overhead electric traction system which are to be electrically separated by the neutral section are secured to one end of an elongate insulated runner; a contact wire and at least one catenary wire of the other of said sections of the system are secured to one end of a second elongate insulated runner in alignment with the first insulated runner; a single elongate metallic member of substantially flattened cross-section is arranged with its major transverse axis substantially vertical and separates and is connected to the other ends of said insulated runners, the undersurfaces of the contact wires, said insulated runners and the elongate metallic member lying in a substantially common plane; and, at each of a plurality of spaced positions along the length of the neutral section, means is provided for suspending the neutral section from a supporting structure, each of at least some of said suspension means being of such a form as to resist any torsional load to which the insulated runners may be subjected and at least said suspension means at each end of the neutral section being so resiliently loaded as to assist in lifting of the neutral section to a height similar to that of the adjacent contact wires as a current collector runs through.

* * * * *